Dec. 5, 1939. K. D. RICHARDS 2,182,409
REEL SEAT
Filed March 11, 1939
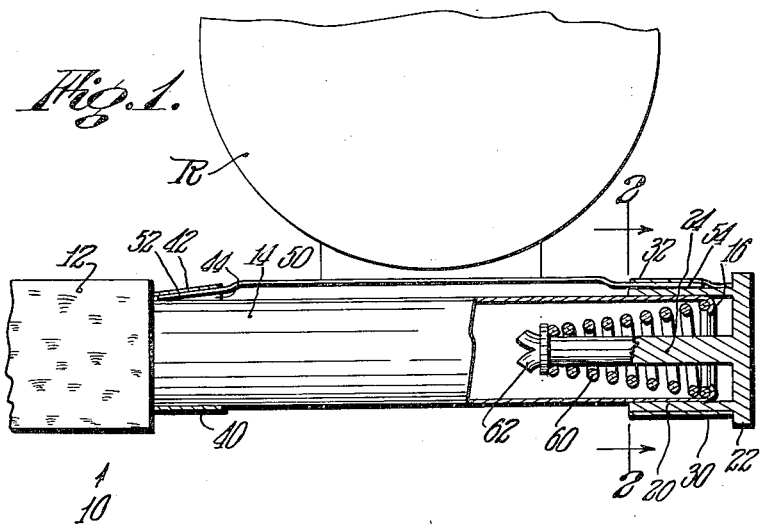
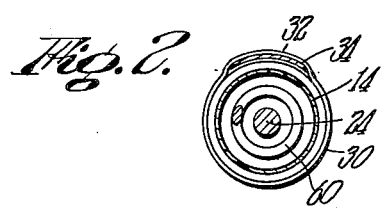
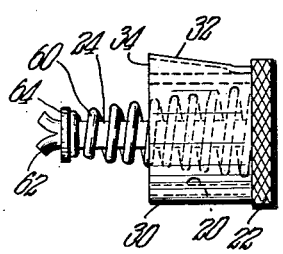
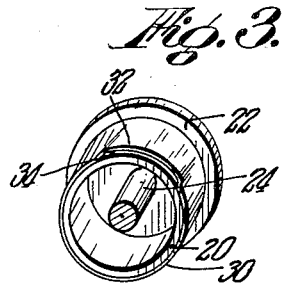
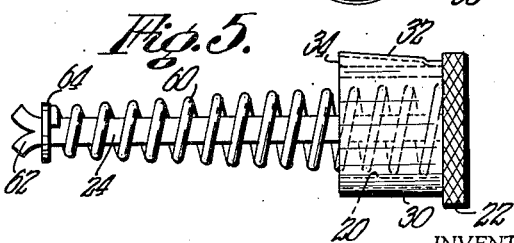
INVENTOR.
Kenneth D. Richards
BY Walter C. Ross
ATTORNEY.

Patented Dec. 5, 1939

2,182,409

UNITED STATES PATENT OFFICE 2,182,409

REEL SEAT

Kenneth D. Richards, Winchendon, Mass.

Application March 11, 1939, Serial No. 261,296

5 Claims. (Cl. 43—22)

My invention relates to improvements in fishing rods and the like and to reel-holding units for association therewith.

According to the principal objects of the invention, an attaching means is provided whereby a reel may be quickly and easily mounted on the fishing rod.

It is an object of the invention to provide a reel-attaching means which is capable of removably receiving reels of the various conventional types and of holding the same securely in association with fishing rods.

It is another object to provide an attractive device which may be made more economically and with fewer operations in the manufacture of parts as well as in assembling than prior devices known to the art.

As will appear, the rod may have the attaching means incorporated therein during the course of its manufacture or the invention may take the form of a unit adapted to be easily associated with a fishing rod of conventional form. In any event, the attaching device is capable of firmly yet releasably holding in place all reels of the type now in common use.

Various other novel features and advantages and other objects of my invention will be hereinafter more fully described and referred to in connection with the accompanying drawing, wherein:

Fig. 1 is a side elevational view showing the device of the invention in association with a fishing rod and reel;

Fig. 2 is a cross-sectional view on the line 2—2 of Fig. 1;

Fig. 3 is a perspective view of what I call the locking member of the device shown in Fig. 1;

Fig. 4 is a side elevational view of certain parts of the apparatus of the invention disengaged from the rod and reel; and Fig. 5 is a side elevational view similar to Fig. 4 with certain parts thereof in different proportions.

Referring now to the drawing in detail, the invention will be more fully described. Like numerals in different figures refer to like parts.

The end of a fishing rod or pole is generally indicated by 10, and it may have a hand-gripping portion 12 forwardly of a hollow tubular end portion or member 14. At or adjacent the outer end of member 14 there is an abutment and while this may be formed in various ways, it may be accomplished by turning the edge inwardly as shown at 16.

What I call a lock member is provided and this preferably consists of a hollow sleeve member 20 having a manually engageable part 22 at one end thereof. This sleeve member 20 is slidable on the end member 14 of the fishing rod.

There is a stem portion 24 on the locking member which extends away from the manually engageable part 22 inwardly of the hollow sleeve member when the sleeve member 20 is in place on the tubular member 14, substantially as shown.

Around the exterior of the locking or sleeve 10 member, there is fixedly disposed a band 30 which has a portion 32 raised upwardly or outwardly from the main body of the member 30 so as to form a socket 34. At a point distant from the said end of the tubular end portion 14 there is provided another band 40 having a portion 42 which is spaced from the band proper to form another socket 44.

The open ends of the sockets 34 and 44 are directed towards one another when the parts are assembled as shown in Fig. 1. The sockets are adapted to receive opposite end portions 52 and 54 of a base part 50 of a reel R.

Around the stem portion 24 of the locking member there is disposed a compression spring 60. The stem has an abutment at or adjacent its free end and this may take the form of an upset 62 as shown which is adapted to serve as a stop for one end of the spring 60, the other end being stopped by abutment 16. A washer 64 may also be disposed on the stem inside the part 62 to act as an abutment or a spring seat for one end of the spring.

When the device is in assembled relation, the spring is in compressed position and the end thereof opposite to the end abutting the washer is forced inwardly so that upon its release it is receivable upon the shoulder or abutment 16 of the tubular part 14 as shown in Fig. 1. The locking member is thus secured to the tubular member and it may be thus pulled outwardly only against the force of the spring.

In some cases, the body 20 may be formed of plastic material. In this event it will be readily understood that the band 30 may be eliminated, at least it need not be a separate part, and the socket 34 may be formed during the molding of the locking member.

It has already been pointed out that both the upset 62 and the abutment 16 may be variously formed. It is believed to be obvious that the abutment may be formed by merely welding a part, for example, to the inside of tube 14 and the purpose of the upset 62 may be accomplished by merely slightly increasing the diameter of the free end of stem 24 in any desired manner.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What it is desired to claim and secure by Letters Patent of the United States is:

1. The combination with a fishing rod having a tubular handle member of means for attaching a reel thereto comprising, a lock member slidable on the end portion of the tubular member, a stem extending from said lock member inwardly into the tubular member, an abutment on the end of the tubular member, an upset on said stem, a compression spring interposed between said abutment and said upset, and bands on said lock member and the tubular member for engaging opposite ends of the base of the reel.

2. The combination with a fishing rod having a tubular handle member of means for attaching a reel thereto comprising, a sleeve member slidable on the end portion of the tubular member, a stem extending from said sleeve member inwardly into the tubular member, an abutment on the end of the tubular member, an upset on said stem, a compression spring interposed between said abutment and said upset, and bands around said sleeve member and the tubular member having portions spaced therefrom providing recesses for receiving opposite ends of the base of the reel.

3. The combination with a fishing rod having a tubular handle member of a means for attaching a reel thereto comprising a lock member slidable on said end portion of the tubular member, a stem in the tubular member extending inwardly from said lock member, an abutment on the end of the tubular member, an upset on said stem, a compression spring interposed between said abutment and said upset, and bands on said lock member and said tubular end portion for engaging opposite ends of the base of the reel.

4. A device adapted to be secured to the tubular end member of a fishing rod having an end abutment and to co-operate therewith for holding a reel comprising, a sleeve member for slidably receiving the end of said tubular member, a stem extending forwardly from said sleeve and beyond its forward end, an abutment on the forward end portion of said stem, and a compression spring on said stem having one end in abutment with said abutment on the stem and its other end adapted to engage the abutment on said tubular member when said sleeve is slidably disposed on said tubular member.

5. A device adapted to be secured to the tubular end member of a fishing rod having an end abutment and to co-operate therewith for holding a reel comprising, a lock member having a manually engageable part and a sleeve part extending forwardly therefrom for slidably receiving the end of said tubular member, a stem extending forwardly from said manually engageable part and beyond its forward end, an abutment on the forward end portion of said stem, and a compression spring on said stem having one end in abutment with said abutment on the stem and its other end adapted to engage the abutment on said tubular member when said sleeve part of the lock member is slidably disposed on said tubular end member of the rod.

KENNETH D. RICHARDS.